(12) United States Patent
Kwatra et al.

(10) Patent No.: US 11,657,811 B2
(45) Date of Patent: May 23, 2023

(54) MODIFICATION OF VOICE COMMANDS BASED ON SENSITIVITY

(71) Applicant: International Business Machines Corporation, Armonk, NY (US)

(72) Inventors: Shikhar Kwatra, San Jose, CA (US); Zachary A. Silverstein, Jacksonville, FL (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 17/026,946

(22) Filed: Sep. 21, 2020

(65) Prior Publication Data

US 2022/0093091 A1 Mar. 24, 2022

(51) Int. Cl.
*G10L 15/22* (2006.01)
*G10L 25/63* (2013.01)
*G10L 15/18* (2013.01)
*G06F 21/62* (2013.01)

(52) U.S. Cl.
CPC .......... *G10L 15/22* (2013.01); *G06F 21/6254* (2013.01); *G10L 15/1815* (2013.01); *G10L 25/63* (2013.01); *G10L 2015/228* (2013.01)

(58) Field of Classification Search
CPC .......... G10L 15/1815; G10L 15/22; G10L 2015/228; G10L 21/6254; G10L 25/63; G06F 21/6254
See application file for complete search history.

(56) References Cited

U.S. PATENT DOCUMENTS

| | | |
|---|---|---|
| 7,177,904 B1 | 2/2007 | Mathur et al. |
| 10,552,742 B2 | 2/2020 | Aggarwal et al. |
| 10,558,923 B1 | 2/2020 | Kenthapadi et al. |
| 2008/0096533 A1 | 4/2008 | Manfredi et al. |
| 2014/0337131 A1 | 11/2014 | Edara |
| 2016/0034696 A1* | 2/2016 | Jooste .............. G06F 1/163 726/1 |
| 2016/0259308 A1 | 9/2016 | Fadell et al. |

(Continued)

FOREIGN PATENT DOCUMENTS

IN 201841010639 A 9/2019

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Eric Yen
(74) *Attorney, Agent, or Firm* — Peter Suchecki

(57) ABSTRACT

Provided is a method, computer program product, and system for modifying an input command by a virtual assistant. A processor may receive an input command from a user. The processor may determine a contextual environment surrounding a virtual assistant. The processor may detect, based on the contextual environment, sensitive information in the input command. The processor may replace the sensitive information with generic information. The processor may respond to the input command with an output response based, in part, on the generic information.

25 Claims, 8 Drawing Sheets

(56) References Cited

U.S. PATENT DOCUMENTS

| | | | |
|---|---|---|---|
| 2017/0236512 A1 | 8/2017 | Williams et al. | |
| 2018/0114033 A1* | 4/2018 | Mathur | |
| 2018/0210738 A1* | 7/2018 | Roman | G06F 3/167 |
| 2019/0103100 A1* | 4/2019 | Rozen | G10L 15/30 |
| 2019/0130286 A1* | 5/2019 | Salameh | G06N 5/022 |
| 2019/0139539 A1* | 5/2019 | Nuzzi | G06F 3/167 |
| 2019/0198016 A1* | 6/2019 | McKenzie | G10L 15/22 |
| 2019/0392176 A1* | 12/2019 | Taron | G06F 3/167 |
| 2020/0112616 A1* | 4/2020 | Strandell | H04L 67/535 |
| 2020/0218502 A1* | 7/2020 | Andersen | G06F 3/0481 |
| 2020/0312327 A1* | 10/2020 | Zhu | H04N 21/4788 |
| 2021/0389924 A1* | 12/2021 | Chong | H04W 12/02 |
| 2022/0101839 A1* | 3/2022 | George | G06F 16/353 |
| 2022/0199073 A1* | 6/2022 | Ramadas | G10L 15/197 |
| 2022/0277567 A1* | 9/2022 | Torsner | G06V 20/50 |

OTHER PUBLICATIONS

Unknown, "Enhancing Privacy of Smart Speakers using Image Recognition and Motion Sensors", an IP.com Prior Art Database Technical Disclosure, IP.com No. IPCOM000255184D, published Sep. 7, 2018, 23 pgs.

* cited by examiner

MODIFICATION OF VOICE COMMANDS BASED ON SENSITIVITY

BACKGROUND

The present disclosure relates generally to the field of voice response systems, and more specifically to modifying voice commands and/or responses to remove sensitive content.

Voice response systems (e.g., smart speakers, virtual assistants, etc.) are designed to perform various tasks that are provided by a user. Voice response systems are usually activated by providing a wakeup command followed by a voice command to perform a given task (e.g., answer a question, turn up/down the volume on the smart speaker, call another user on a linked telephone system, etc.). Once the voice command is given, the voice response system will complete the task.

SUMMARY

Embodiments of the present disclosure include a computer-implemented method, computer program product, and system for modifying an input command of a virtual assistant. A processor may receive an input command from a user. The processor may determine a contextual environment surrounding a virtual assistant. The processor may detect, based on the contextual environment, sensitive information in the input command. The processor may replace the sensitive information with generic information. The processor may respond to the input command with an output response based, in part, on the generic information.

Further embodiments of the present disclosure include a computer-implemented method, computer program product, and system for modifying an input command of a virtual assistant in the presence of other users. A virtual assistant may monitor one or more Internet of Things (IoT) data feeds from one or more IoT devices. The virtual assistant may receive an input command from a user. The virtual assistant may detect sensitive information in the input command. The virtual assistant may determine if one or more other users are present in an environment surrounding the virtual assistant. In response to determining that the one or more other users are present in the environment, the virtual assistant may remove the sensitive information from the input command and any associated sensitive information from an output response. Once the sensitive information is removed, the virtual assistant may respond with the output response.

Further embodiments of the present disclosure include a computer-implemented method, computer program product, and system for requesting an alternative input method for receiving an input command by a virtual assistant. A virtual assistant may monitor one or more IoT data feeds from one or more IoT devices. The virtual assistant may receive an input command from a user. The virtual assistant may detect sensitive information in the input command. The virtual assistant may determine if one or more other users are present in an environment surrounding the virtual assistant. In response to determining that the one or more others user are present in the environment, the virtual assistant may determine if an output response can be generated without the sensitive information. If the output response cannot be generated without the sensitive information, the virtual assistant will request that the user restate the input command using an alternative input method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
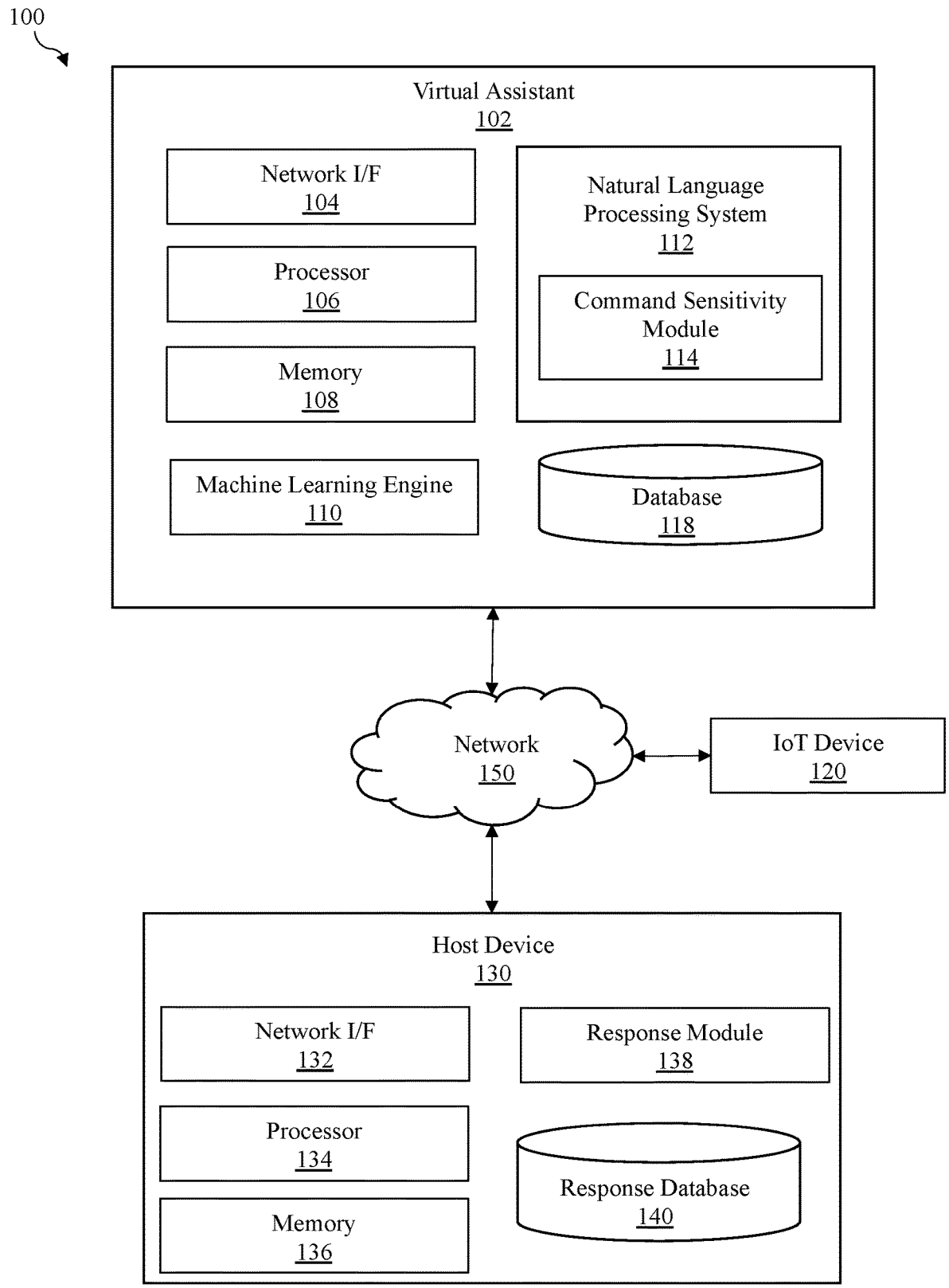
FIG. 1 illustrates a block diagram of an example voice response system in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of voice response systems, and more particularly to modifying voice commands and/or responses to remove sensitive content. While the present disclosure is not necessarily limited to such applications, various aspects of the disclosure may be appreciated through a discussion of various examples using this context.

Voice response systems (e.g., smart speakers, virtual assistants, etc.) are designed to perform various tasks provided by a user. Voice response systems are usually activated by providing a wakeup command followed by the voice command to perform a given task (e.g., answer a question, turn up/down the volume on the smart speaker, call another user on a linked telephone system, etc.). Once the voice command is given, the voice response system can interpret the command to determine a task requested by the user, and complete the task.

In some instances, a user may provide a voice command that includes sensitive information and/or request a response that may also contain sensitive information. Traditional voice response systems will not recognize that a voice command contains sensitive information, and they may respond to the voice command with further sensitive information without taking into account the presence of other individuals in the surrounding environment. For example, a user may ask a virtual assistant/smart speaker to order a product and charge it to their personal checking account while in the presence of a friend. In response, the smart speaker may respond confirming that the product was ordered and charged to the user's bank account while audibly providing the actual bank account number. In many instances, the user may not want this sensitive information shared out loud while in the presence of another person. However, traditional voice response system are not configured to identify and remove sensitive information from the voice command and/or the response to a command which may cause sensitive information to be revealed to other users (e.g., non-privileged listeners) in an unwanted way.

Embodiments of the present disclosure provide a method, a computer program product, and a voice response system for modifying voice commands and/or responses to remove sensitive information. A virtual assistant (e.g., smart speaker, smart phone, etc.) may receive an input command from a user. For example, a user may command the virtual assistant to play a certain song. Once received, the virtual assistant may analyze the surrounding contextual environment to determine the sensitivity of the input command. The contextual environment may be determined from various contextual data indicating, for example, the presence of other persons in the environment, what topics are being discussed, the emotional state of users in the environment, and the like. For example, the virtual assistant will determine who else is in the room where the virtual assistant is located in addition to the user that provided the voice command. The virtual assistant may determine the contextual environment by utilizing one or more IoT devices and/or IoT data feeds. For example, using an IoT camera that is communicatively coupled to the virtual assistant, the users in the contextual environment may be identified through image recognition. In another example, users may be identified by analyzing spoken content that is detected through a microphone (e.g., the virtual assistant may differentiate the voice of the owner of the house from voices of other users in the room). In another example, users may be identified through the presence of a smart device being recognized within the environment (e.g., via one or more other smart phones detected on a home wireless network).

Once the contextual environment is determined, the virtual assistant may process the input command to determine if it contains any sensitive information. The virtual assistant may utilize a pre-processing engine to perform the determination of sensitive information prior to sending to a server (e.g., cloud server) for processing. In embodiments, the pre-processing engine may utilize a region-based convolutional neural network (R-CNN) to enable context and pattern recognition using historical user interactions with the virtual assistant and/or manual configuration of settings to make sensitive information determinations. For example, the virtual assistant may track post-command behavior of the user to determine what type of commands include sensitive information. For example, the virtual assistant may determine that input commands and/or responses associated with personal identification data (e.g., bank information, social security number, etc.) are considered sensitive because past behavior indicates the user stops the virtual assistant from responding aloud with this type of data. For example, while the smart speaker announced previous results including a bank account number, the user/listener may have instructed the virtual assistant to stop. Accordingly, when the user provides the same command in the future, the virtual assistant may determine the command and/or the results themselves contain sensitive information.

Additionally, in some embodiments, the user may manually configure sensitivity settings of the virtual assistant. For example, a first user may designate that certain calendar information is privileged, and thus, not shared audibly within the hearing distance of a second user.

In embodiments, the pre-processing engine analyzes the received voice command and segments the voice command into data constructs or portions. This may be performed using natural language processing. The pre-processing engine determines which portions contain sensitive information based on the contextual environment and removes those respective portions. In some embodiments, a convolutional gated recurrent neural network (Con-GRNN) and long short-term memory (LSTM)-GRNN may be used for sentence tokenization and buffering of the input command to extract the relevant portions or filter the sensitive information in input command. The Con-GRNN may provide a sentence vector(s), and the LSTM-GRRN may combine the sentence vector(s) to form a buffered vector representation for classification of the sensitive information in the input command. In embodiments, the portions may be compared to a sensitive topic and/or content database. The database may be constructed using crowdsourced sensitivity data, direct user input data, and/or third-party marked sensitive content.

In embodiments, determining which portion of the command contains sensitive information may be based on one or more sensitivity rules. In embodiments, the sensitivity rules may be based on the contextual environment and be automatically adjusted depending on the contextual data received from the IoT data feeds. In some embodiments, the sensitivity rules may be weighted based on one or more attributes of the contextual environment. For example, the sensitivity rules may be weighted based on various attributes such as the specific identity of the other user(s) in the room, the relationship of the other users with the main user, the time of day, season, and the like.

Returning to the previous example from above, if a child is determined (e.g., using image recognition) to be present in the surrounding environment when the user requests the virtual assistant to play a certain song that has profanity in the lyrics, the virtual assistant may identify the song as containing sensitive information. The virtual assistant may identify various portions of the song lyrics (e.g., slang words, profanity, etc.) and reconstruct the input command to request an edited version of the song. However, if only adults are determined to be in the room, the virtual assistant may not identify the lyrics as containing sensitive information based on the contextual environment and may respond by playing the unedited version of the song.

Once the sensitive information is removed from the input command, the pre-processing engine may reconstruct the input command without the sensitive information. In embodiments, the pre-processing engine may replace the sensitive information with generic information and reconstruct the input command. Once the voice command has be reconstructed without the sensitive information, the virtual assistant may submit the input command to a server (e.g., cloud server) for processing. The server may process the input command without the sensitive information and provide the virtual assistant an output response that has no further sensitive information.

In embodiments, the virtual assistant may determine that generating an output response may not be possible without including the sensitive information in the input command and/or the output response itself. For example, prior to relaying the reconstructed input command to the server, the pre-processing engine may validate the completeness of the input command for execution. If the input command is found to be incomplete, the virtual assistant may request that the user restate the input command using an alternative input method (e.g., email, text messages, input on a pop-up on display, etc.). For example, a user may command the virtual assistant to order a product online and instruct the virtual assistant to charge the user's associated credit card while in the presence of another user. However, in order to process the request, the virtual assistant requires the user to provide a card verification value (CVV) number from the credit card. The CVV number may be identified as sensitive information but may be necessary to complete the transaction. Therefore, the virtual assistant will request the input the CVV number using a different input method, such as responding to a text message with the CVV number. In this way, if the virtual assistant is unable to remove the sensitive information from the input command and/or output response to complete the given task, the virtual assistant will be able to receive alternate input/output methods used to prevent revealing sensitive information to other users.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example voice response system 100 in which illustrative embodiments of the present disclosure may be implemented. In some embodiments, the voice response system 100 may include a virtual assistant 102, a host device 130, and an Internet of Things (IoT) device 120. In some embodiments, the virtual assistant 102 may be a smart speaker that is configured to receive input commands (e.g., voice commands) from one or more users and audibly output responses generated from the host device 130. In some embodiments, the virtual assistant 102 may monitor and/or receive an IoT data stream from the IoT device 120.

Figure 6:
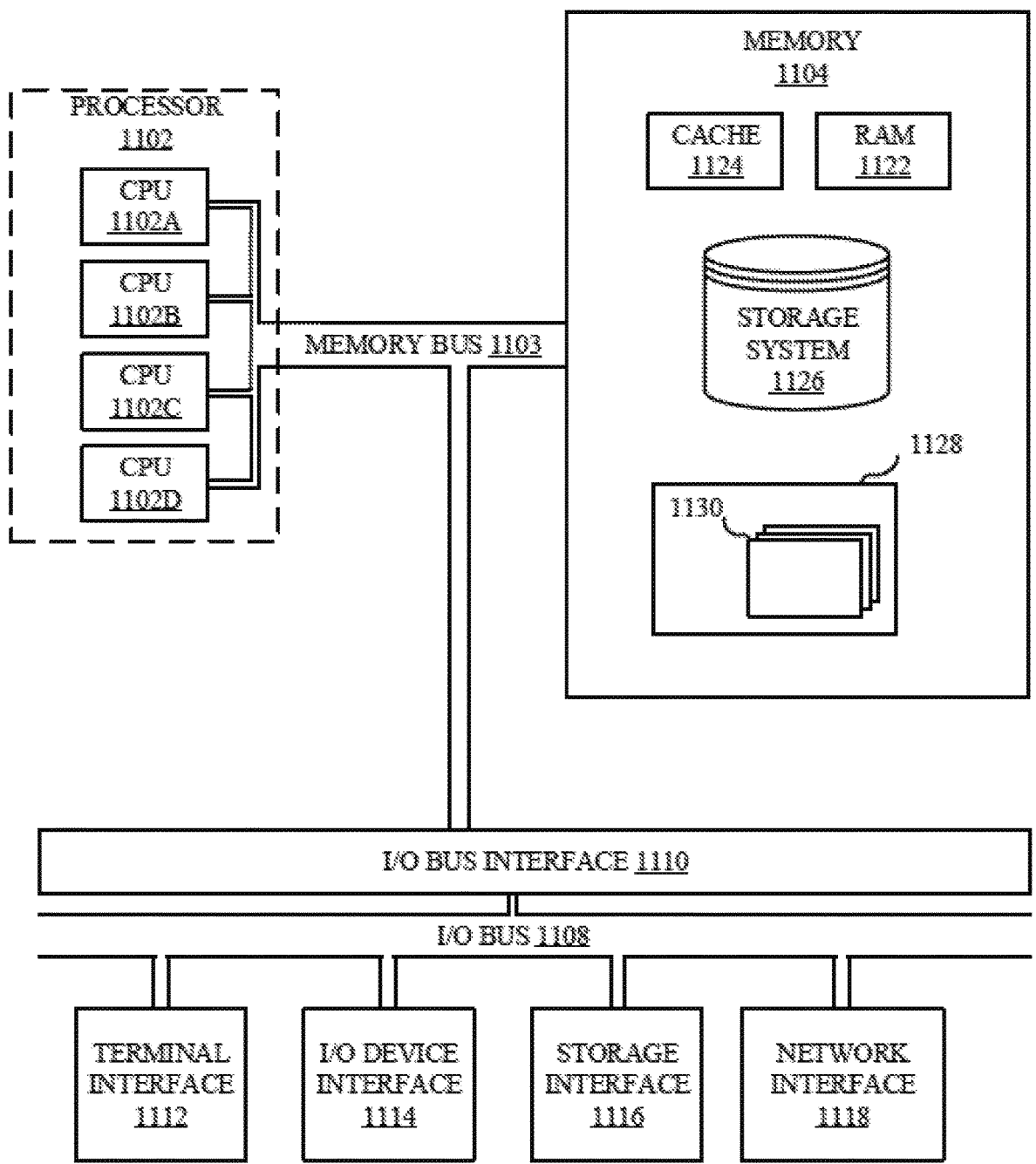
FIG. 6 illustrates a high-level block diagram of an example computer system that may be used in implementing one or more of the methods, tools, and modules, and any related functions, described herein, in accordance with embodiments of the present disclosure.

Consistent with various embodiments, the virtual assistant 102, the host device 130, and the IoT device 120 may be computer systems and may be substantially similar to computer system 1101 detailed in FIG. 6. The virtual assistant 102 and the host device 130 may include one or more processors 106 and 134 and one or more memories 108 and 136, respectively. The virtual assistant 102 and the host device 130 may be configured to communicate with each other through an internal or external network interfaces 104 and 132. The network interfaces 104 and 132 may be, e.g., modems or network interface cards. In some embodiments, the virtual assistant 102 and/or the host device 130 may be equipped with a display or monitor. Additionally, the virtual assistant 102 and/or the host device 130 may include optional input devices (e.g., a keyboard, mouse, sensor, camera, scanner, or other input device), and/or any commercially available or custom software (e.g., browser software, communications software, server software, natural language processing software, search engine and/or web crawling software, filter modules for filtering content based upon predefined parameters, etc.). In some embodiments, the host device 130 may be a server, desktop, laptop, or hand-held device. In some embodiments, the IoT device 120 may be configured as a smart phone, smart watch, sensor, camera, and/or a smart speaker that may generate contextual data associated with a contextual environment surrounding the virtual assistant 102.

The virtual assistant 102, the host device 130, and the IoT device 120 may be distant from each other and communicate over a network 150. In some embodiments, the host device 130 may be a central hub from which virtual assistant 102 and the IoT device 120 can establish a communication connection, such as in a client-server networking model. Alternatively, the host device 130, the IoT device 120, and virtual assistant 102 may be configured in any other suitable networking relationship (e.g., in a peer-to-peer configuration or using any other network topology).

In some embodiments, the network 150 can be implemented using any number of suitable communications media. For example, the network 150 may be a wide area network (WAN), a local area network (LAN), an internet, or an intranet. In certain embodiments, the virtual assistant 102, the IoT device 120, and the host device 130 may be local to each other, and communicate via any appropriate local communication medium. For example, the virtual assistant 102, the IoT device 120, and the host device 130 may communicate using a local area network (LAN), one or more hardwire connections, a wireless link or router, or an intranet. In some embodiments, the virtual assistant 102, the IoT device 120, and the host device 130 may be communicatively coupled using a combination of one or more networks and/or one or more local connections. For example, the virtual assistant 102 may be hardwired to the host device 130 (e.g., connected with an Ethernet cable), while the IoT device 120 may communicate with the virtual assistant 102 using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150. In embodiments, network 150 may be substantially similar cloud computing environment 50 illustrated in FIG. 7.

In embodiments, the virtual assistant 102 may enable users to submit an audible input command and receive an output response. The input command may be pre-processed to remove any sensitive information prior to sending it to the host device 130 to obtain an output response. In embodiments, the input command is pre-processed using natural language processing system 112. An example natural language processing system is discussed in more detail in FIG. 2.

In the illustrated embodiment, the NLP system 112 includes a command sensitivity module 114 that is configured to determine whether the input command and/or the response contains sensitive information. The command sensitivity module 114 may analyze the input command by segmenting the command into a plurality of portions. The command sensitivity module 114 analyzes each of the portions using natural language processing and applies one or more sensitivity rules to determine if each respective portion contains sensitive information. The command sensitivity module 114 may determine that a respective portion contains sensitive information when the one or more of the sensitivity rules is met and remove the sensitive information/portion. The sensitivity rules may be based on a determination of the contextual environment (e.g., who the user is, whether other users are present, the location of the environment, spoken content between users, the emotional state of the users present, etc.) surrounding the virtual assistant 102. For example, the sensitivity rules may indicate the input command contains sensitive information based on identifying other users present in the contextual environment. In embodiments, the sensitivity rules may be based on historical interaction data of the user related to the virtual assistant 102, crowdsourced sensitivity data, and/or third-party marked sensitivity data. For example, the natural language processing system 112 may gather crowdsourced data indicating various topics, words, objects, and the like that contain sensitive information and make sensitivity determinations using this data. In embodiments, the historical interaction data and sensitivity data may be stored in database 118.

In embodiments, once the command sensitivity module 114 removes the sensitive information from the input command, the command sensitivity module 114 may restructure the input command by replacing the sensitive information with generic information. Once that input command has been reconstructed, the virtual assistant 102 may send the input command to the host device 130 for processing. The host device 130 utilizes a response module 138 to analyze the input command and generate a response. The response may be determined by utilizing a response database 140. Once generated, the response module 138 may send the response to the virtual assistant 102 to be outputted to the user. In some embodiments, the virtual assistant 102 may further analyze the response received from the host device 130 to verify that the response does not include any further sensitive information. If detected, the command sensitivity module 114 may remove the sensitive information and reconstruct the response before relaying the reconstructed response to the user.

In embodiments, the virtual assistant 102 may use a machine learning engine 110 to improve its capabilities in making sensitivity determinations automatically through experience and/or repetition without procedural programming. For example, machine learning engine 110 may analyze the accuracy of the sensitivity determination by monitoring the user's post-command and/or post response interaction with the virtual assistant. If the machine learning engine 110 identifies that the user pauses/stops the virtual assistant 102 from outputting a response, it may indicate that sensitive information was not properly identified and was left in the input command. In another example, the machine learning engine 110 may determine that too much sensitive information was removed from an input command based on multiple follow-up commands provided by the user regarding the original input command. Using this interaction data, the machine learning engine 110 may modify algorithms for making sensitivity determinations and adjust them accordingly. In this way, the virtual assistant 102 may become more accurate in identifying sensitive information in the input commands.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

While FIG. 1 illustrates a voice response system 100 with a single host device 130, a single IoT device 120, and a single virtual assistant 102, suitable computing environments for implementing embodiments of this disclosure may include any number of virtual assistants, IoT devices, and host devices. The various modules, systems, and components illustrated in FIG. 1 may exist, if at all, across a plurality of host devices, IoT devices, and virtual assistants.

It is noted that FIG. 1 is intended to depict the representative major components of an example voice response system 100. In some embodiments, however, individual components may have greater or lesser complexity than as represented in FIG. 1, components other than or in addition to those shown in FIG. 1 may be present, and the number, type, and configuration of such components may vary.

Figure 2:
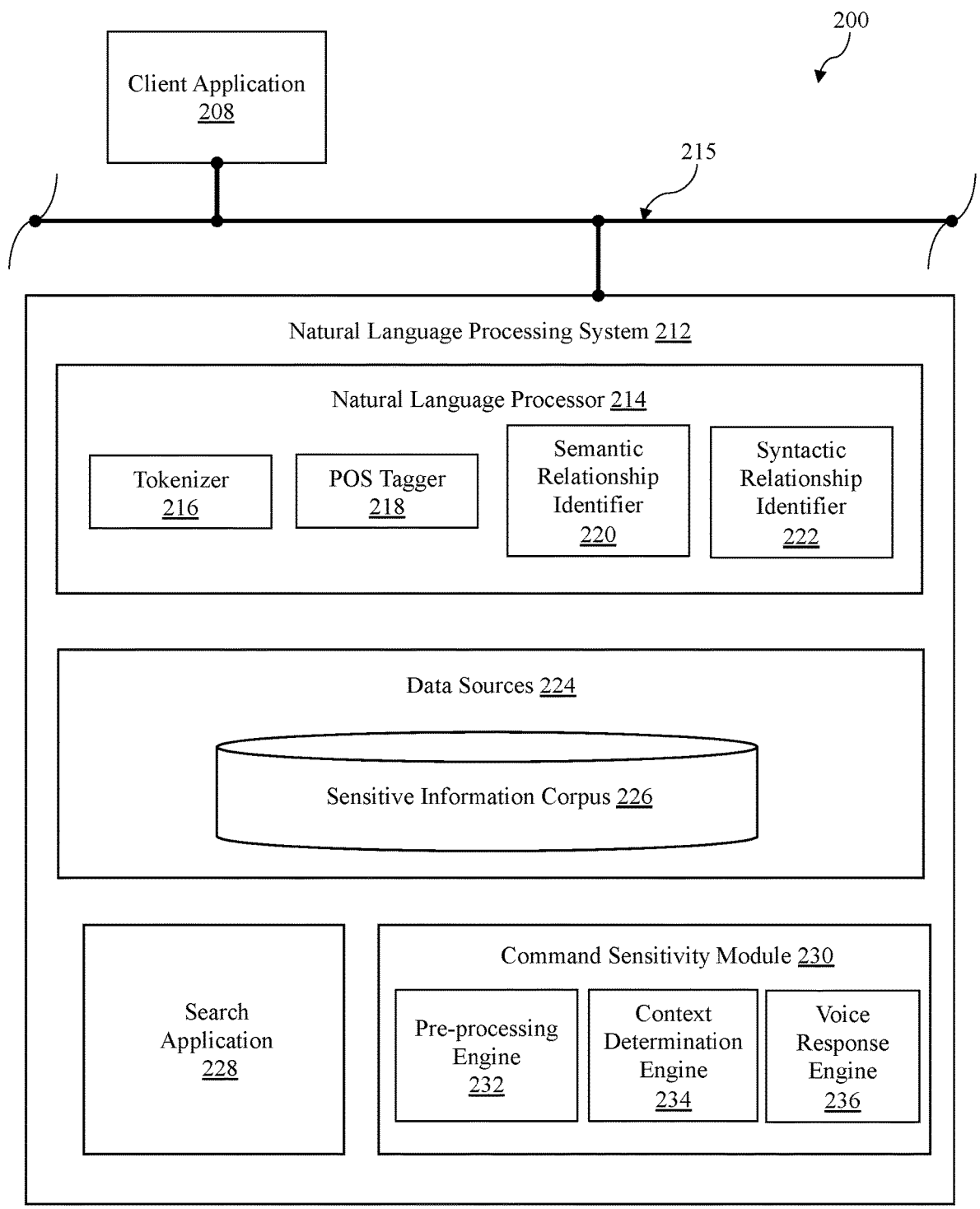
FIG. 2 illustrates a block diagram of an example system architecture, including a natural language processing system, configured to ingest a voice input command and detect sensitive information, in accordance with embodiments of the present disclosure.

Referring now to FIG. 2, shown is a block diagram of an example system architecture 200, including a natural language processing system 212, configured to ingest an input command and detect sensitive information, in accordance with embodiments of the present disclosure. In some embodiments, a virtual assistant (such as virtual assistant 102 of FIG. 1) may receive an input command (e.g., voice command) to be analyzed by the natural language processing system 212 which may be housed locally on the virtual assistant. The input command may be converted to machine readable text and analyzed by the natural language processing system 212. In some embodiments, the natural language processing system 212 may be housed on a host device (such as host device 130 of FIG. 1). Such a virtual assistant may include a client application 208, which may send/receive the input command via network 215.

Consistent with various embodiments, the natural language processing system 212 may analyze the input command to identify sensitive information in the input command. In some embodiments, the natural language processing system 212 may include a natural language processor 214, data sources 224, a search application 228, and a command sensitivity module 230. The natural language processor 214 may be a computer module that analyzes the received input command and may perform various methods and techniques for analyzing the input command (e.g., syntactic analysis, semantic analysis, etc.). The natural language processor 214 may be configured to recognize and analyze any number of natural languages. In some embodiments, the natural language processor 214 may parse portions of the input command. Further, the natural language processor 214 may include various modules to perform analyses on portions of the input command. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analysis. The tokenizer 216 may convert a sequence of characters into a sequence of tokens. A token may be a string of characters included in the input command and categorized as a meaningful symbol. Further, in some embodiments, the tokenizer 216 may identify word boundaries in the input command and break any portions within the input command into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in the input command to correspond to a particular part of speech. The POS tagger 218 may read a portion or other text of the input command in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed input commands. Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of the input command with part of speech categories. In some embodiments, the POS tagger 218 may tag tokens or words of the input command to be parsed by the natural language processing system 212.

In some embodiments, the semantic relationship identifier 220 may be a computer module that is configured to identify semantic relationships of recognized text elements (e.g., words, phrases) in the input command. In some embodiments, the semantic relationship identifier 220 may determine functional dependencies between input commands and output responses and other semantic relationships.

Consistent with various embodiments, the syntactic relationship identifier 222 may be a computer module that is configured to identify syntactic relationships in an input command composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that parses an input command and generates corresponding data structures for one or more portions of the input command. For example, in response to receiving an input command at the natural language processing system 212, the natural language processor 214 may output parsed text elements from the input command with sensitive information removed and replaced with generic information.

In some embodiments, the output of the natural language processor 214 may be stored as a sensitive information corpus 226 in one or more data sources 224. In some embodiments, data sources 224 may include data warehouses, information corpora, data models, and document repositories. The sensitive information corpus 226 may enable data storage and retrieval of sensitivity information and/or sensitivity content used to make sensitivity determinations regarding the input command. In some embodiments, the sensitive information corpus 226 may be a storage mechanism that houses a standardized, consistent, clean, and integrated copy of the ingested and parsed input commands used to reconstruct current input commands. The information corpus 226 may also include a list of concepts found in the ingested electronic documents used to make sensitivity determinations regarding portions of the input command. In some embodiments, the information corpus 226 may be a relational database.

In some embodiments, the natural language processing system 212 may include a command sensitivity module 230. The command sensitivity module 230 may be a computer module that is configured to detect, identify, and/or determine sensitive information in an input command provided by a user. In some embodiments, the command sensitivity module 230 may contain submodules. For example, the command sensitivity module 230 may contain a pre-processing engine 232, a context determination engine 234, and a voice response engine 236. The pre-processing engine 232 may be configured to parse an input command using the natural language processor 214 and related subcomponents 216-222. In some embodiments, the pre-processing engine may utilize a convolutional gated recurrent neural network (Conv-GRNN) and a long short-term memory gated recurrent neural network (LSTM-GRNN) for sentence tokenization and buffering of the input command to extract and/or filter the relevant sensitive information. The LSTM-GRNN may provide a sentence vector, and the Conv-GRNN may combine the sentence vectors to form a buffered vector representation in order to make sensitivity determinations.

In embodiments, the pre-processing engine 232 may segment the input command into a plurality of portions and analyze each portion for sensitive information. The pre-processing engine 232 may remove portions of the input command containing sensitive information and reconstruct the input command with generic information. The sensitivity determination may be based on one or more sensitivity rules.

The sensitivity rules may be based in part on a contextual environment surrounding the virtual assistant. The context determination engine 234 may determine the contextual environment surrounding the virtual assistant using one or more IoT data feeds from one or more IoT devices. The contextual environment may be determined by analyzing the IoT data feeds to identify various context such as other users present in the environment, a location of the environment, spoken content between users present in the environment, the emotional state of the users in the environment, and the like. Once the contextual environment is determined, the pre-processing engine 232 may make sensitivity determination on the various portions of the input command and remove any sensitive information according to the sensitivity rules. Once the sensitive information is removed, the pre-processing engine 232 may reconstruct the input command using generic information. The generic information may be information that is similar to the sensitive information in form or purpose but lacks the sensitive aspects. The reconstructed input command will be sent by the command sensitivity module 230 to the host device where a response to the command may be generated and returned to the virtual assistant.

In some embodiments, the pre-processing engine 232 may determine that generating an output response may not be possible without including the sensitive information in the input command and/or the output response itself. For example, the pre-processing engine 232 may validate the completeness of the reconstructed input command before sending it to the host device for processing. If the input command is found to be incomplete, then the voice response engine 236 may request that the user provide further input commands using an alternative input method (e.g., providing the input command and/or any sensitive information in a text message). In some embodiments, the voice response engine 236 may request an authorization from the user to allow the pre-processing engine 236 to use the sensitive information if it is unable to reconstruct a response without it. For example, a user may prefer that the virtual assistant just use the sensitive information rather than inputting it via an alternative method (e.g., text, email, etc.) out of convenience.

Figure 3:
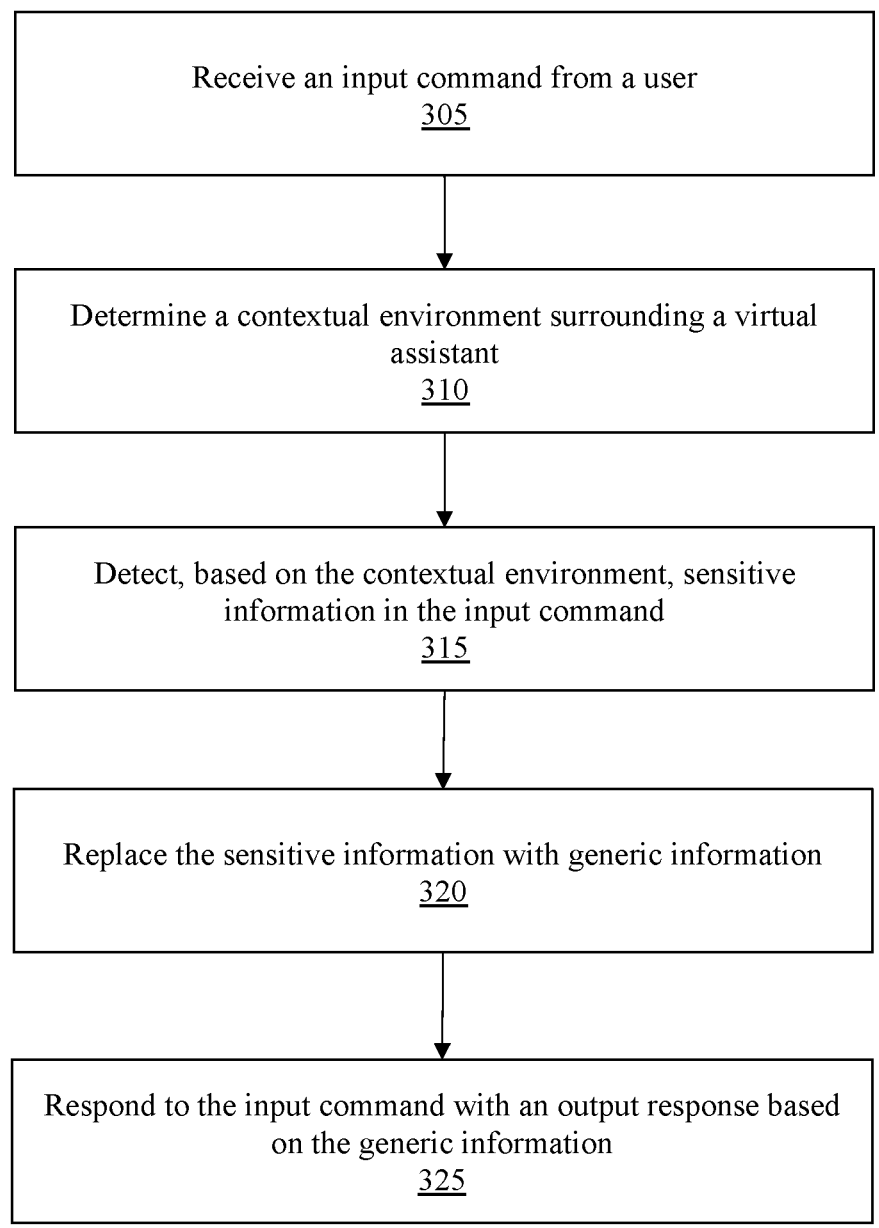
FIG. 3 illustrates a flow diagram of an example process for modifying an input command of a virtual assistant, in accordance with embodiments of the present disclosure.

Referring now to FIG. 3, shown is a flow diagram of an example process 300 for modifying an input command of a virtual assistant, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. The process 300 may be performed by processor 106 and/or natural language processor 214 exemplified in FIG. 1 and FIG. 2, respectively.

The process 300 begins by a virtual assistant (e.g., virtual assistant 102 of FIG. 1) receiving an input command from a user. This is illustrated at step 305. In embodiments, the input command may be a voice activated command. In some embodiments, the input command may be associated with a user's account information (e.g., email account, website account, etc.). For example, a first user may configure the virtual assistant to respond to the first user when various packages are delivered to the first user's house by ingesting shipping and delivery details (e.g., input command) from a linked user account.

The process 300 continues by determining a contextual environment surrounding the virtual assistant. This is illustrated at step 310. The contextual environment surrounding the virtual assistant may be determined by analyzing one or more IoT data feeds from one or more communicatively coupled IoT devices. For example, the virtual assistant may utilize image recognition data from a communicatively coupled IoT camera to determine that a second user is present in the environment with the first user. As another example, the virtual assistant may analyze received audio information to identify the presence of one or more other persons around the user. As yet another example, the virtual assistant may identify electronic devices (e.g., smart phones) connected to the same network that the virtual assistant is connect to, or connected to the virtual assistant itself, to determine the contextual environment.

The process 300 continues by detecting, based on the contextual environment, sensitive information in the input command. This is illustrated at step 315. The virtual assistant may detect the sensitive information by segmenting the input command into a plurality of portions where each portion is analyzed using natural language processing and compared to one or more sensitivity rules. The sensitivity rules may be based on the contextual environment (e.g., presence of other users in the environment, location of the environment, spoken content between users in the environment, emotional state of users in the environment, etc.).

Returning to the previous example, the virtual assistant may receive an input command such as shipping details that a holiday gift package has arrived at the first user's house. However, the first user may prefer that details regarding the first user's gift packages not be revealed by the virtual assistant when the second user is around because the gift may be for the second user. Therefore, because a second user is determined to be present in the contextual environment, the shipping details regarding the holiday package may be determined as sensitive information.

The process 300 continues by replacing the sensitive information with generic information. This is illustrated at step 320. Returning to the previous example, the virtual assistant may analyze the input command and determine that portions of the command contain sensitive information. For example, the virtual assistant may determine that the shipping details indicate that a video game system has been delivered to the first user's house. The virtual assistant will identify the words "video game system" as being sensitive information based one or more sensitivity rules and remove those words from the input command. The virtual assistant may replace the sensitive information with generic information. For example, the virtual assistant may reconstruct the input command by replacing the words "video game system" with generic words such as "gift" or "package." The reconstructed input command may be then securely sent to a host device in order to generate an output response for the first user.

The process 300 continues by responding to the input command with an output response based, in part, on the generic information. This is illustrated at step 325. Returning to the previous example, the virtual assistant will output the response by stating, "a package has been delivered" rather than indicating the specific details of the package (e.g., a video game system has been delivered). In this way, the sensitive information is prevented from being revealed in the presence of the second user. In embodiments, once the output response is sent to the user, the process 300 may end or return to step 305 if further input commands are received from the user.

In some embodiments, the input command may contain a request for sensitive information rather than the sensitive information itself. In such an instance and depending on the determined contextual environment (e.g., other users detected to be present), any sensitive information identified in the response to the request for sensitive information may be removed prior to outputting the response the user. For example, a first user may ask the virtual assistant about events and/or appointments that are coming up on the first user's calendar this week while in the presence of a second user. The virtual assistant may identify that the first user has plans for a surprise birthday party for the second user on the calendar. Because the second user is identified as being in the room, the virtual assistant will remove any mention of the surprise party (e.g., sensitive information) from the output response and replace it by indicating the first user has an appointment coming up.

Figure 4:
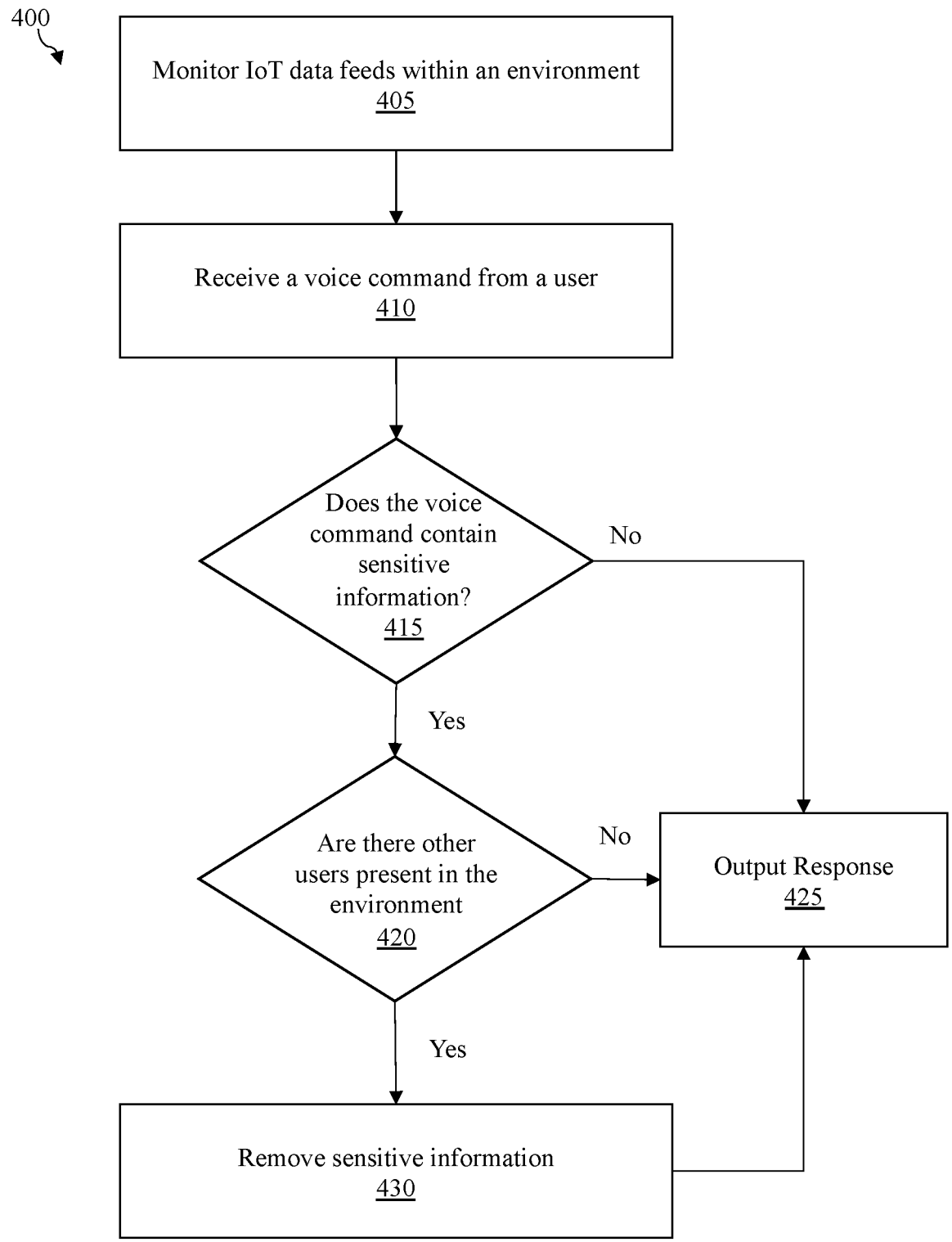
FIG. 4 illustrates a flow diagram of an example process for modifying an input command of a virtual assistant in the presence of other users, in accordance with embodiments of the present disclosure.

Referring now to FIG. 4, shown is a flow diagram of an example process 400 for modifying an input command of a virtual assistant in the presence of other users, in accordance with embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In embodiments, process 400 may be, in addition to, or a subset of process 300 and/or 500. In embodiments, the process 400 is a computer-implemented process. The process 400 may be performed by processor 106 and/or natural language processor 214 exemplified in FIG. 1 and FIG. 2, respectively.

The process 400 begins by a virtual assistant (e.g., virtual assistant 102 of FIG. 1) monitoring one or more Internet of Things (IoT) data feeds from one or more IoT devices. This is illustrated at step 405. For example, the virtual assistant may monitor the data feed from an IoT camera to determine various contextual data such as what users are in the surrounding environment.

The process 400 continues by the virtual assistant receiving an input command from a user. This is illustrated at step 410. For example, a first user may provide an input command to the virtual assistant to order a product online using the first user's bank account information on file.

The process 400 continues by the virtual assistant determining whether there is sensitive information in the input command. This is illustrated at step 415. If no sensitive information is detected in the input command ("No" at step 415), the process 400 continues to step 425, and the virtual assistant outputs a response. If sensitive information is detected in the input command ("Yes" at step 415), then the process 400 continues to step 420. For example, the virtual assistant may determine that any input commands requesting the use of the first user's bank account information may be considered as containing sensitive information based on prior user interaction behavior and/or manual configuration of the sensitivity settings.

At step 420, the process 400 continues by the virtual assistant determining if one or more other users are present in an environment surrounding the virtual assistant. If no other users are determined to be present in the environment ("No" at step 420), then the process 400 continues to step 425, and the virtual assistant outputs a response. For example, even though the bank account information may be considered as sensitive information, the virtual assistant may not remove the sensitive information prior to processing a response since no other users are determined to be present in the environment.

If other users are detected in the environment surrounding the virtual assistant ("Yes" at step 420), then the process 400 continues to step 430, where any sensitive information is removed from the input command. In embodiments, the virtual assistant may remove the sensitive information from input command and reconstruct the command prior to sending it for processing at a server. In embodiments, the virtual assistant may reconstruct the input command using generic information or encrypted information. Returning to the previous example, the input command may be reconstructed by the virtual assistant to remove or encrypt any mention of the user's bank account information when ordering the product. Once reconstructed, the input command may be sent to a host device (e.g., server) for processing. The host device may generate an output response using the generic information in the input command or may remove any sensitive information from the output response itself. For example, the host device may generate an output response indicating that the product has been ordered without mentioning the user's actual bank account number that was charged. In this way, the virtual assistant may provide secure reconstructed input commands to the host device and receive secure output responses that may be provided to the user when various sensitivity rules are met.

The process 400 continues by the virtual assistant responding to the user with the output response. This is illustrated at step 425. In another embodiment, the virtual assistant may analyze the output response to the input command and remove any further associated sensitive information from an output response. Once the output response is sent, the process 400 may end or return to step 405 if any further responses are received from a user.

Figure 5:
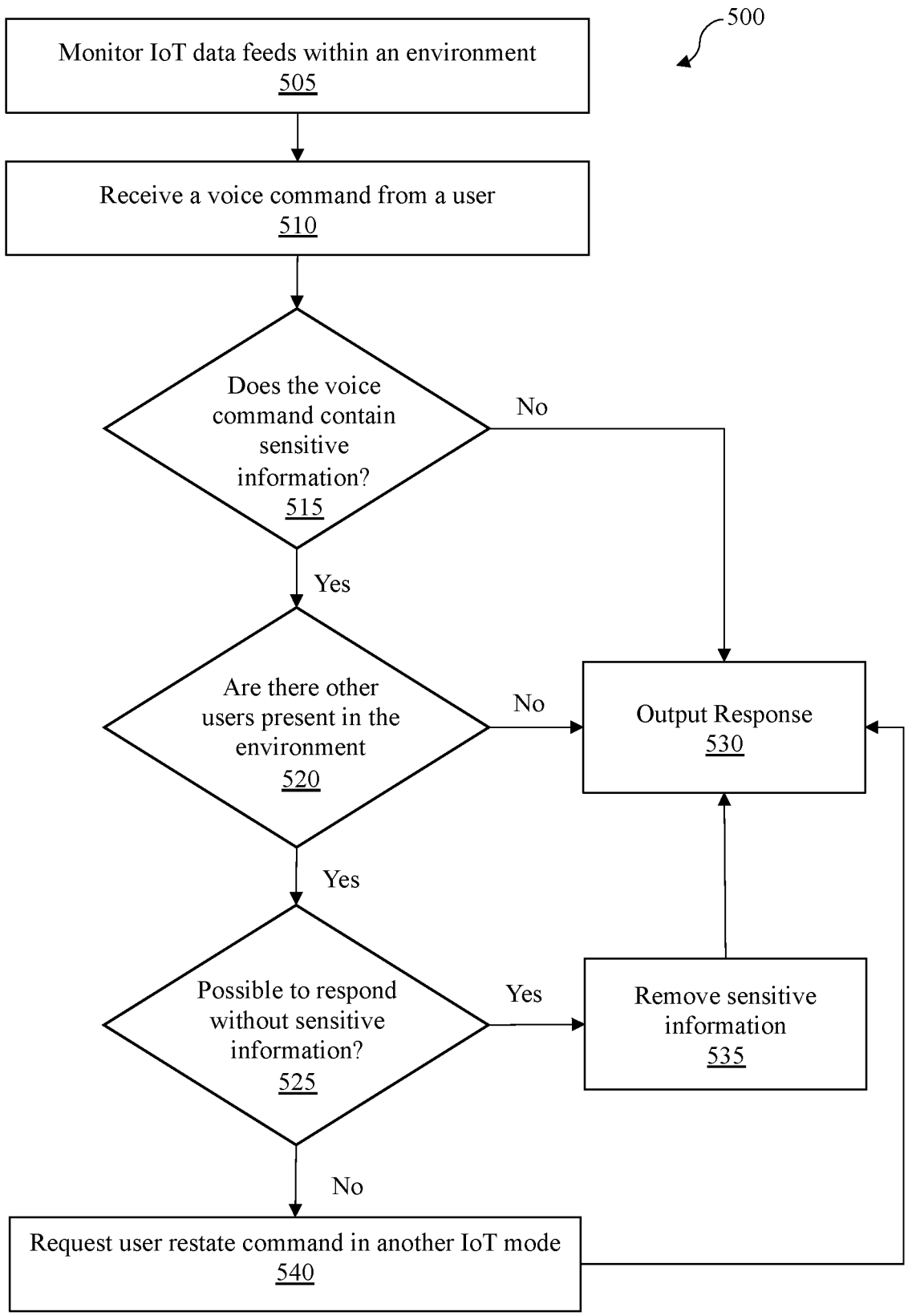
FIG. 5 illustrates a flow diagram of an example process for requesting an alternative input method for receiving an input command by a virtual assistant, in accordance with embodiments of the present disclosure.

Referring now to FIG. 5, shown is a flow diagram of an example process 500 for requesting an alternative input method for receiving an input command by a virtual assistant, in accordance with embodiments of the present disclosure. The process 500 may be performed by processing logic that comprises hardware (e.g., circuitry, dedicated logic, programmable logic, microcode, etc.), software (e.g., instructions run on a processor), firmware, or a combination thereof. In embodiments, process 500 may be, in addition to, or a subset of process 300 and/or 400. In embodiments, the process 500 is a computer-implemented process. The process 500 may be performed by processor 106 and/or natural language processor 214 exemplified in FIG. 1 and FIG. 2, respectively.

The process 500 begins by a virtual assistant (e.g., virtual assistant 102 of FIG. 1) monitoring one or more IoT data feeds from one or more IoT devices. This is illustrated at step 505. For example, the virtual assistant may monitor the data feed from an IoT camera to determine various contextual data such as what users are in the surrounding environment.

The process 500 continues by the virtual assistant receiving an input command from a user. This is illustrated at step 510. For example, a first user may request that the virtual assistant order food to be delivered for the first user and a second user present in the environment.

The process 500 continues by the virtual assistant determining if any sensitive information is detected in the input command or if the input command contains a request for sensitive information. This is illustrated at step 515. If no sensitive information is detected in the input command ("No" at step 515), the process 500 continues to step 530 and outputs a response to the input command. For example, if the virtual assistant has the first user's credit card information on file, the virtual assistant may not need and/or detect any sensitive information in the input command and respond that the food has been successfully ordered.

If sensitive information is detected in the input command ("Yes" at step 515), the process 500 continues to step 520.

Returning to the previous example, the virtual assistant may analyze the input command and require that the first user provide a CVV number associated with the user's credit card to approve the transaction for ordering the requested food. However, the CVV number may be classified as sensitive information.

At step 520, the process 500 continues by the virtual assistant determining if one or more other users are present in an environment surrounding the virtual assistant. If no other users are determined to be present in the environment ("No" at step 520), then the process 500 continues to step 530 and the virtual assistant outputs a response to the input command (e.g., requesting the first user provide the CVV out loud). If other users are detected in the environment surrounding the virtual assistant ("Yes" at step 520), then the process 500 continues to step 525. Returning to the previous example, the virtual assistant will determine that the second user is present in the environment based on the monitoring of the IoT data feed from the IoT camera from step 505.

At step 525, the virtual assistant determines if an output response can be generated without the sensitive information being included in the input command and/or in the output response itself. If it is determined that the virtual assistant can generate a response without the sensitive information ("Yes" at step 525), then the process 500 continues to step 535 wherein the sensitive information is removed or encrypted (e.g., any credit card information will be encrypted) and the output response is reconstructed. Once removed, the process 500 will continue to step 530, and the virtual assistant will output a response to the input command. For example, the output response will indicate the food order has been processed.

However, if the virtual assistant determines that it is not possible to generate an output response without the sensitive information contained in the input command ("No" at step 525), then the virtual assistant will request that the user restate the input command using an alternative input method. This is illustrated at step 540. In embodiments, the user may input a second command using an IoT device (e.g., computer, smart phone, smart watch, etc.). Returning to the previous example, because the CVV number has been identified as sensitive information (e.g., based on past user history, crowd sourcing, and/or third-party determination), the virtual assistant will request that the first user enter the CVV number via an alternative method (e.g., text message, email, pop-up on a personal display, etc.) to prevent revealing the sensitive information to the second user. Once the user restates the input command using an alternative input method, the process will continue to step 530, and the virtual assistant will output a response to the input command. Following the above example, once the CVV number is received using the alternative input method, the virtual assistant will indicate the transaction has been approved and the food will be delivered. After outputting the response, the process 500 may end or may return to step 505 if another input command is received.

Referring now to FIG. 6, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 300, 400, and 500).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 6 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 1101. In some embodiments, however, individual components may have greater or lesser complexity than as represented in FIG. 6, components other than or in addition to those shown in FIG. 6 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
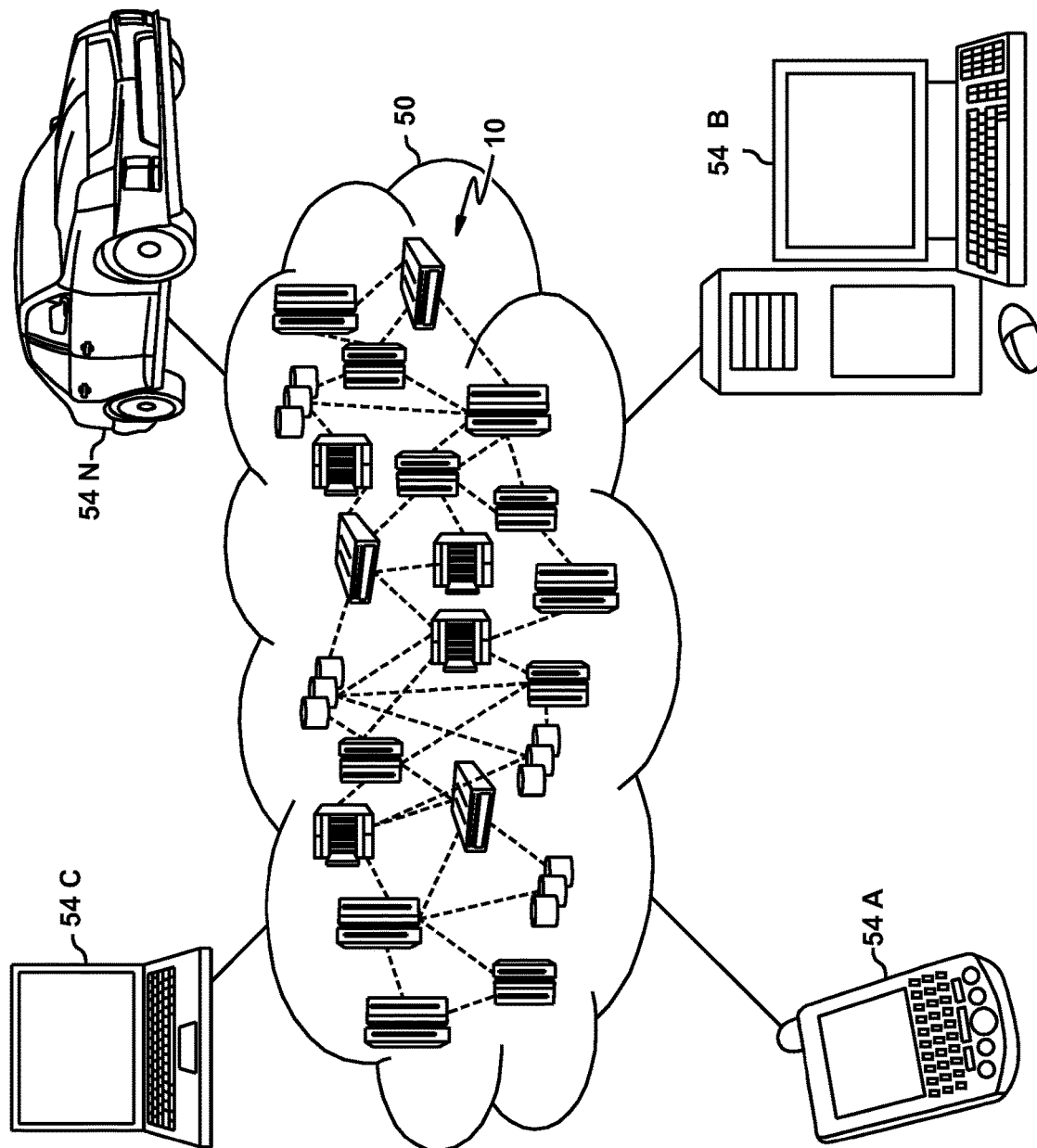
FIG. 7 depicts a cloud computing environment in accordance with embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
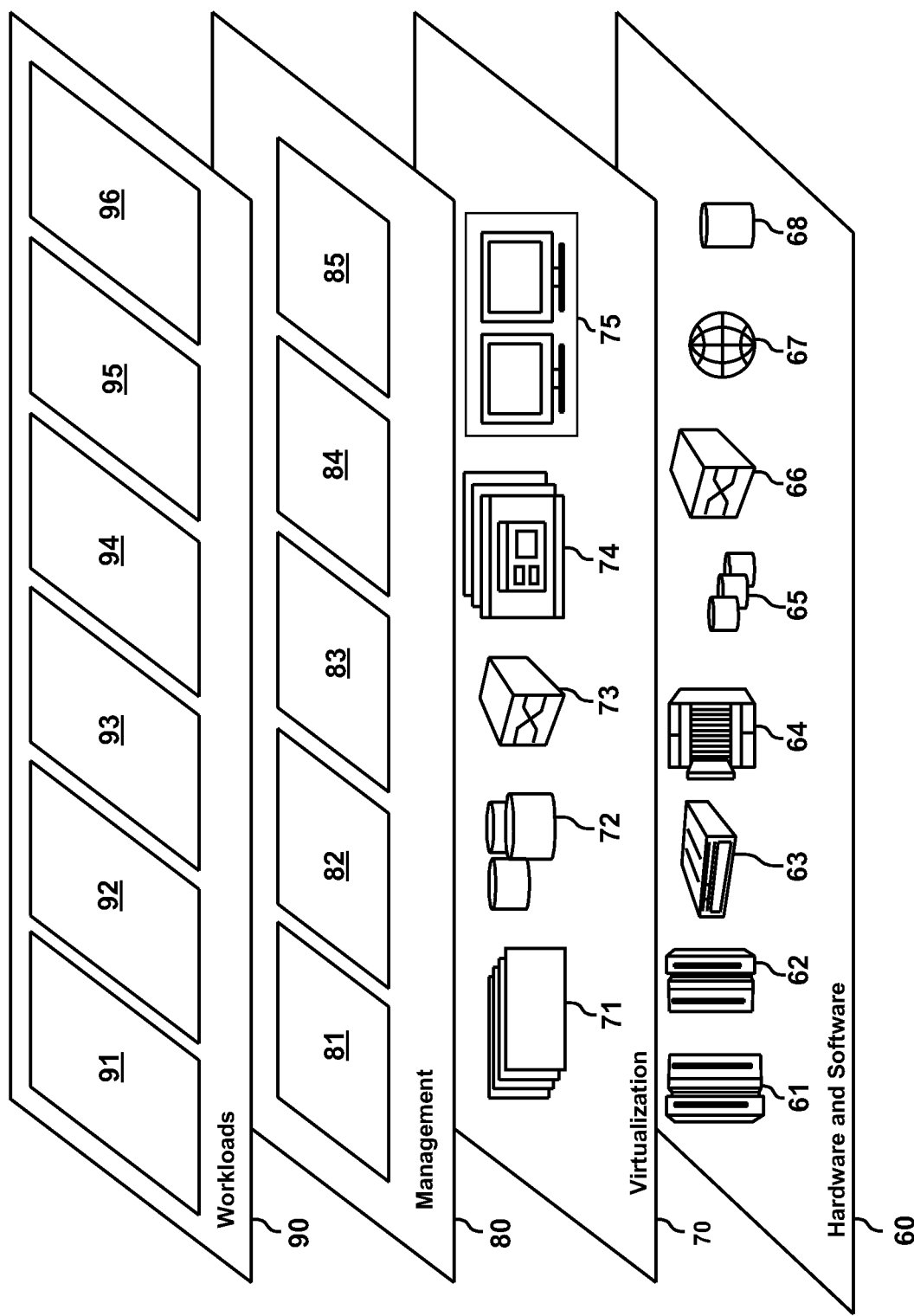
FIG. 8 depicts abstraction model layers in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and command sensitivity module software 68 in relation to the command sensitivity module 114 of virtual assistant 102 illustrated in FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., $100a$, $100b$, $100c$) or punctuation followed by differing numbers (e.g., $100$-$1$, $100$-$2$, or $100.1$, $100.2$), use of the reference character only without the letter or following numbers (e.g., $100$) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for modifying an input command of a virtual assistant, comprising:
   receiving the input command from a user;
   determining a contextual environment surrounding the virtual assistant;
   detecting, based on the contextual environment, sensitive information in the input command;
   replacing the sensitive information with generic information; and
   responding to the input command with an output response based, in part, on the generic information.

2. The computer-implemented method of claim 1, wherein determining the contextual environment surrounding the virtual assistant is based in part on at least one operation selected from the group consisting of:
   identifying a second user present in the contextual environment;
   identifying a location of the contextual environment;
   identifying spoken content between the user and the second user present in the contextual environment; and
   identifying an emotional state of one or more users present in the contextual environment.

3. The computer-implemented method of claim 1, wherein detecting the sensitive information in the input command comprises:
   segmenting the input command into a plurality of portions;
   analyzing, using natural language processing, each portion with respect to the contextual environment and one or more sensitivity rules; and
   identifying one or more portions that meet the one or more sensitivity rules.

4. The computer-implemented method of claim 3, wherein the one or more sensitivity rules are based on historical interaction data of the user related to the virtual assistant.

5. The computer-implemented method of claim 3, wherein the one or more sensitivity rules are based on historical crowdsourced sensitivity data.

6. The computer-implemented method of claim 3, wherein the one or more sensitivity rules are based on third-party marked sensitivity data.

7. The computer-implemented method of claim 3, wherein the one or more sensitivity rules are weighted based on attributes related to the contextual environment.

8. A system comprising:
   a processor; and
   a computer-readable storage medium communicatively coupled to the processor and storing program instructions which, when executed by the processor, cause the processor to perform a method comprising:
      receiving an input command from a user;
      determining a contextual environment surrounding a virtual assistant;
      detecting, based on the contextual environment, sensitive information in the input command;
      replacing the sensitive information with generic information; and
      responding to the input command with an output response based, in part, on the generic information.

9. The system of claim 8, wherein determining the contextual environment surrounding the virtual assistant is based in part on at least one operation selected from the group consisting of:
   identifying a second user present in the contextual environment;
   identifying a location of the contextual environment;
   identifying spoken content between the user and the second user present in the contextual environment; and
   identifying an emotional state of one or more users present in the contextual environment.

10. The system of claim 8, wherein detecting the sensitive information in the input command, comprises:
    segmenting the input command into a plurality of portions;
    analyzing, using natural language processing, each portion with respect to the contextual environment and one or more sensitivity rules; and
    identifying one or more portions that meet the one or more sensitivity rules.

11. The system of claim 10, wherein the one or more sensitivity rules are based on historical interaction data of the user related to the virtual assistant.

12. The system of claim 10, wherein the one or more sensitivity rules are based on historical crowdsourced sensitivity data.

13. The system of claim 10, wherein the one or more sensitivity rules are based on third-party marked sensitivity data.

14. The system of claim 10, wherein the one or more sensitivity rules are weighted based on attributes related to the contextual environment.

15. A computer program product comprising a computer-readable storage medium having program instructions embodied therewith, the program instructions executable by a processor to cause the processor to perform a method comprising:
    receiving an input command from a user;
    determining a contextual environment surrounding a virtual assistant;
    detecting, based on the contextual environment, sensitive information in the input command;
    replacing the sensitive information with generic information; and
    responding to the input command with an output response based, in part, on the generic information.

16. The computer program product of claim 15, wherein determining the contextual environment surrounding the virtual assistant is based in part on at least one operation selected from the group consisting of:
    identifying a second user present in the contextual environment;
    identifying a location of the contextual environment;
    identifying spoken content between the user and the second user present in the contextual environment; and
    identifying an emotional state of one or more users present in the contextual environment.

17. The computer program product of claim 15, wherein detecting the sensitive information in the input command, comprises:
    segmenting the input command into a plurality of portions;

analyzing, using natural language processing, each portion with respect to the contextual environment and one or more sensitivity rules; and identifying one or more portions that meet the one or more sensitivity rules.

18. The computer program product of claim 17, wherein the one or more sensitivity rules are based on historical interaction data of the user related to the virtual assistant.

19. The computer program product of claim 17, wherein the one or more sensitivity rules are based on historical crowdsourced sensitivity data.

20. A computer-implemented method for modifying an input command of a virtual assistant in the presence of other users, comprising:

monitoring, by the virtual assistant, one or more Internet of Things (IoT) data feeds from one or more IoT devices;

receiving, by the virtual assistant, the input command from a user;

detecting, by the virtual assistant, sensitive information in the input command;

determining, by the virtual assistant, if one or more other users are present in an environment surrounding the virtual assistant;

removing, by the virtual assistant and in response to determining that one or more other users are present in the environment, the sensitive information from the input command and any associated sensitive information from an output response; and responding, by the virtual assistant, with the output response.

21. The computer-implemented method of claim 20, wherein the one or more IoT devices are selected from the group consisting of: a camera; a smart speaker; a sensor; and a smart phone.

22. The computer-implemented method of claim 20, wherein detecting the sensitive information in the input command, comprises:

segmenting, by the virtual assistant, the input command into a plurality of portions;

analyzing, by the virtual assistant and using natural language processing, each portion with respect to a contextual environment and one or more sensitivity rules; and identifying, by the virtual assistant, one or more portions that meet the one or more sensitivity rules.

23. A computer-implemented method for requesting an alternative input method for receiving an input command by a virtual assistant, comprising:

monitoring, by the virtual assistant, one or more Internet of Things (IoT) data feeds from one or more IoT devices;

receiving, by the virtual assistant, the input command from a user;

detecting, by the virtual assistant, sensitive information in the input command;

determining, by the virtual assistant, if a second user is present in an environment surrounding the virtual assistant;

determining, by the virtual assistant and in response to determining that the second user is present in the environment, if an output response can be generated without the sensitive information; and requesting, by the virtual assistant and in response to not being able to generate the output response without the sensitive information, that the user restate the input command using an alternative input method.

24. The computer-implemented method of claim 23, wherein the one or more IoT devices are selected from the group consisting of: a camera; a smart speaker; a sensor; and a smart phone.

25. The computer-implemented method of claim 23, further comprising:

receiving, by the virtual assistant, a second input command from a second IoT device; and responding, by the virtual assistant, to the second IoT device with an output response.

* * * * *